US011116243B2

(12) United States Patent
Brown et al.

(10) Patent No.: US 11,116,243 B2
(45) Date of Patent: Sep. 14, 2021

(54) ANTIBROWNING COMPOSITIONS

(71) Applicant: CAL POLY CORPORATION, San Luis Obispo, CA (US)

(72) Inventors: John Wyatt Brown, Atascadero, CA (US); James Kendall Green, Los Osos, CA (US)

(73) Assignee: Cal Poly Corporation, San Luis Obispo, CA (US)

(*) Notice: Subject to any disclaimer, the term of this patent is extended or adjusted under 35 U.S.C. 154(b) by 121 days.

(21) Appl. No.: 16/566,496

(22) Filed: Sep. 10, 2019

(65) Prior Publication Data
US 2021/0022359 A1 Jan. 28, 2021

Related U.S. Application Data

(60) Division of application No. 14/724,283, filed on May 28, 2015, now abandoned, which is a continuation of application No. 13/626,691, filed on Sep. 25, 2012, now Pat. No. 9,044,045.

(51) Int. Cl.
A23B 7/154 (2006.01)
A23L 3/358 (2006.01)
A23B 7/157 (2006.01)
A23B 7/16 (2006.01)
A23L 3/3463 (2006.01)
A23L 3/3508 (2006.01)
A23B 4/20 (2006.01)
A23B 4/24 (2006.01)
A23L 2/44 (2006.01)
A23L 3/3544 (2006.01)

(52) U.S. Cl.
CPC ............... *A23L 3/358* (2013.01); *A23B 4/20* (2013.01); *A23B 4/24* (2013.01); *A23B 7/154* (2013.01); *A23B 7/157* (2013.01); *A23B 7/16* (2013.01); *A23L 2/44* (2013.01); *A23L 3/3463* (2013.01); *A23L 3/3508* (2013.01); *A23L 3/3544* (2013.01); *A23V 2002/00* (2013.01)

(58) Field of Classification Search
CPC .. A23B 7/154; A23B 4/20; A23B 4/24; A23B 7/157
USPC ....................................................... 426/267
See application file for complete search history.

(56) References Cited

U.S. PATENT DOCUMENTS

| 4,339,451 | A | | 7/1982 | Albaum et al. |
| 5,198,254 | A | | 3/1993 | Nisperos-Carriedo et al. |
| 5,925,395 | A | | 7/1999 | Chen |
| 5,939,117 | A | * | 8/1999 | Chen ..................... A23L 3/3481 426/267 |
| 8,512,781 | B2 | | 8/2013 | Ricks |

FOREIGN PATENT DOCUMENTS

| CA | 2424200 A1 | 9/2004 |
| WO | 2011123949 A1 | 10/2011 |

OTHER PUBLICATIONS

Gomes et al., Hydrogen ion concentration affects quality retention and modifies the effect of calcium additives on fresh-cut 'Rocha' pear; Postharvest Biology and Technology 58 (2010) 239-246 (Year: 2010).*
Oms-Oliu et al., Recent approaches using chemical treatments to preserve quality of fresh-cut fruit: A review; Postharvest Biology and Technology 57 (2010) 139-148 (Year: 2010).*
Guan et al., Combination of Sodium Chlorite and Calcium Propionate Reduces Enzymatic Browning And Microbial Population of Fresh-Cut "Granny Smith" Apples; Journal of Food Science—vol. 75, Nr. 2, 2010 (Year: 2010).*
Aguayo et al., "Effects of calcium ascorbate treatments and storage atmosphere on antioxidant activity and quality of fresh-cut apple slices", Postharvest Biology and Technology 57, vol. 52, pp. 54-60, Mar. 1, 2010.
Alvarez-Parrilla et al., "Dual effect of β-cyclodextrin (β-CD) on the inhibition of apple polyphenol oxidase by 4-hexylresorcinol (HR) and methyl jasmonate (MJ)", Food Chemistry, vol. 101, pp. 1346-1356, 2007.
Arias et al., "Ascorbic Acid and 4-Hexylresorcinol Effects on Pear PPO and PPO Catalyzed Browning Reaction", Journal of Food Science, vol. 72, No. 8, pp. C422-C429, 2007.
Bates, R.P., "The Retardation of Enzymatic Browning in Avocado Puree and Guacamole", Proc. Fla. State Hort. Soc., vol. 81, 8 pages. 1968.
Buta et al., "Extending Storage Life of Fresh-Cut Apples Using Natural Products and Their Derivatives", Journal of Agricultural and Food Chemistry, vol. 47, No. 1, pp. 1-6, Jan. 1999.
"Botulism in the United States, 1899-1996", Handbook for Epidemiologists, Clinicians, and Laboratory Workers, Centers for Disease Control, 43 pages, 1998.
Chou et al., "Quantitative Analysis of Dose-Effect Relationships: The Combined Effects of Multiple Drugs or Enzyme nhibitors", Adv. Enzyme Regul., vol. 22, pp. 27-55 1984.
Corbo et al., "Fresh-cut fruits preservation: current status and emerging technologies", Applied Microbiology and Microbiol Biotechnology, pp. 1143-1154 2010.
Duan et al., "Effect of nitric oxide on pericarp browning of harvested longan fruit in relation to phenolic metabolism", Food Chemistry, vol. 104, pp. 571-576, 2007.
Fan et al., "Quality of Fresh-cut Apple Slices as Affected by Low-dose Ionizing Radiation and Calcium Ascorbate Treatment", Journal of Food Science, vol. 70, No. 2, pp. S143-S148, 2005.
Davidson et al., "Antimicrobial Agents", Food Additives, Chapter 20, p. 24, 2002.
Garcia et al., "Preservative Treatments for Fresh-Cut Fruits and Vegetables", Dept. Food Science and Tech, Univ. of California, Davis, 32 pages, Feb. 2002.

(Continued)

Primary Examiner — Brent T O'Hern
(74) Attorney, Agent, or Firm — McKee, Voorhees & Sease, PLC

(57) ABSTRACT

Antibrowning compositions for food products, for example fresh produce, are disclosed herein. These antibrowning compositions can also, for example, be used to prevent growth of bacteria, yeasts and molds in the food products. Methods for using the antibrowning compositions are also disclosed herein.

21 Claims, 4 Drawing Sheets

(56) References Cited

OTHER PUBLICATIONS

Gomes et al., "Hydrogen ion concentration affects quality retention and modifies the effect of calcium additives on fresh-cut 'Rocha' pear", Postharvest Biology and Technology, vol. 58, pp. 239-246, Jul. 17, 2010.
Guan et al., "Combination of Sodium Chlorite and Calcium Propionate Reduces Enzymatic Browning and Microbial Population of Fresh-Cut "Granny Smith" Apples", vol. 75, No. 2, pp. M72-M77, 2010.
He et al., "Enzymatic browning and its control in fresh-cut produce", Stewart Postharvest Review, vol. 6, No. 3, 7 pages, 2007.
Lu et al., "Efficacy of sodium chlorite as an inhibitor of enzymatic browning in apple slices", Food Chemistry, vol. 104, pp. 824-829, 2007.
Luo et al., "Duel effectiveness of sodium chlorite for enzymatic browning inhibition and microbial inactivation on fresh-cut apples", Food Science and Technologies, vol. 44, pp. 1621 1625, Feb. 17, 2011.
Nobile et al., "New packaging strategies to preserve fresh-cut artichoke quality during refrigerated storage", Innovative Food Science and Emerging Technologies, vol. 10, pp. 128-133, Jun. 22, 2008.
Olivas et al., "Alginate coatings for preservation of minimally processed 'Gala' apples", Postharvest Biology and Technology, vol. 45, pp. 89-96, 2007.
Oms-Oliu et al., "Recent approaches using chemical treatments to preserve quality of fresh-cut fruit: A review", Postharvest Biology and Technology, vol. 57, pp. 139-148, Apr. 3, 2010.
Perez-Gago et al., "Effect of Solid Content and Lipid Content of Whey Protein Isolate-Beeswax Edible Coatings on Color Change of Fresh-cut Apples", Journal of Food Science, vol. 68, No. 7, pp. 2186-2191, 2003.
Pilizota et al., "Novel Browning Inhibitor Formulation for Fresh-cut Apples", Journal of Food Science, vol. 69, No. 4, pp. 140-143, 2004.
Pristijono et al., "Inhibition of browning on the surface of apple slices by short term exposure to nitric oxide (NO) gas", Postharvest Biology and Technology, vol. 42, pp. 256-259, Jul. 3, 2006.
Rocha et al., "Influence of Chemical Treatment on Quality of Cut Apple (cv. JONAGORED)", Journal of Food Quality, vol .21, pp. 13-28 1998.
Saftner et al., "Sanitary dips with calcium propionate, calcium chloride, or a calcium amino acid chelate maintain quality and shelf stability of fresh-cut honeydew chunks", Postharvest Biology and Technology, vol. 29, pp. 257-269, Feb. 28, 2003.
Sapers et al., "Browning Inhibition in Fresh-Cut Pears", Journal of Food Science, vol. 63, No. 2, pp. 342-346, 1998.
Schneider et al., "Preventing Foodborne Illness: Clostridium botulinum", University of Florida, handout, 5 pages, Feb. 2004.
Soliva-Fortuny et al., "New advances in extending the shelf-life of fresh-cut fruits: a review", Trends in Food Science & Technology, vol. 14, pp. 341-353, 2003.
Cal Poly Corporation in connection with PCT/US2013/061223 filed Sep. 23, 2013, "The International Search Report and the Written Opinion of the International Searching Authority, or the Declaration", 130 pages, dated Nov. 29, 2013.
Varela et al., The use of calcium cholride in minimally processed apples: A sensory approach, Eur. Food Res. Technol, vol. 224, pp. 461-467, 2007.
Wang et al., "Control of Browning and Microbial Growth on Fresh-Cut Apples by Sequential Treatment of Sanitizers and Calcium Ascorbate", Journal of Food Science, vol. 72, No. 1, pp. M1-M7 2007.

\* cited by examiner

ANTIBROWNING COMPOSITIONS

CROSS-REFERENCE TO RELATED APPLICATIONS

This application is a Divisional Application of U.S. Ser. No. 14/724,283 filed May 28, 2015, which is a Continuation Application of U.S. Ser. No. 13/626,691, filed Sep. 25, 2012, now U.S. Pat. No. 9,044,045, issued Jun. 2, 2015, the contents of which are all herein expressly incorporated by reference in their entireties.

BACKGROUND OF THE INVENTION

1. Field of the Invention

The present disclosure is related to antibrowning compositions for food products, for example fresh produce, and methods for using the same. In some instances, the antibrowning compositions can also prevent growth of bacteria, yeasts, and/or molds on food products.

2. Description of the Related Art

Appearance has been shown to have a major effect on a consumer's decision to purchase foods, such as fresh-cut fruit and vegetable products. Enzymatic browning is one of the major problems affecting the aesthetic quality of fresh fruits and vegetables. The change in color during browning is due to the oxidative reactions of phenolic compounds by polyphenol oxidase and the reaction products, o-quinones, to various polymerized products. Browning not only affects color, but can also adversely affect flavor and nutritional value Enzymatic browning can be inhibited by chemical inhibiting agents, but the use of browning inhibitors in food is limited by considerations relevant to toxicity, wholesomeness, and their effect on taste, texture, and cost. Browning inhibitors have been classified by their primary mode of action as: (1) reducing agents; (2) acidulants; (3) chelating agents; (4) complexing agents; (5) enzyme inhibitors; and (6) enzyme treatments. Sulphites, considered as reducing agents, were the most widely used, but are now subject to regulatory restrictions because of potential adverse health effects.

Currently, some antibrowning methods provide favorable results to reduce browning of food products; however, they are expensive to use and do not provide effective inhibition of microbial growth. There is a need for new compositions and methods for preventing browning and microbial growth in food products with low cost and high effectiveness.

SUMMARY OF THE INVENTION

Some embodiments provided herein provide an antibrowning composition comprising calcium ascorbate, calcium propionate, and calcium chloride.

In some embodiments, the weight ratio of calcium ascorbate, calcium propionate, and calcium chloride is about (3-25):(0.25-2):(0.2-0.3). In some embodiments, calcium ascorbate is present in the amount of about 80.7% by weight, calcium propionate is present in the amount of 16.1% by weight, and calcium chloride is present in the amount of about 3.2% by weight, based on the total weight of the composition.

In some embodiments, the composition is aqueous. In some embodiments, calcium ascorbate is present in the aqueous composition in the amount no more than about 25% (weight/volume). In some embodiments, calcium ascorbate is present in the aqueous composition in the amount from about 3% (weight/volume) to about 25% (weight/volume). In some embodiments, calcium propionate is present in the aqueous composition in the amount from about 0.25% (weight/volume) to about 2% (weight/volume). In some embodiments, calcium chloride is present in the aqueous composition in the amount from about 0.2% (weight/volume) to about 0.3% (weight/volume). In some embodiments, calcium ascorbate is present in the aqueous composition in the amount of about 5% (weight/volume), calcium propionate is present in the aqueous composition in the amount of about 1% (weight/volume), and calcium chloride is present in the aqueous composition in the amount of about 0.2% (weight/volume). In some embodiments, the composition has a pH value of about 6 to about 7.5.

In some embodiments, the composition disclosed herein further comprises one or more additional enzymatic browning inhibitors selected from the group consisting of sulfites, ascorbic acid, erythorbic acid, cysteine, butylated hydroxyanisole (BHA), butylated hydroxytoluene (BHT), tertiary-butyl hydroxyquinone (TBHQ), propyl gallate (PG), tocopherols, flavonoid compounds, cinnamic acid derivatives, coumarins, citric acid, malic acid, phosphoric acids, sorbic acid, tartaric acid, oxalic acid, succinic acids, ATP, pyrophosphates, porphyrins, EDTA, aromatic carboxylic acids, substituted resorcinols, halide salts, honey, and amino acids.

Some embodiments disclosed herein provide a method for inhibiting browning of food, comprising: contacting a food product with an antibrowning composition in an amount sufficient to inhibit enzyme browning, wherein the antibrowning composition comprises calcium ascorbate, calcium propionate, and calcium chloride.

In some embodiments, contacting the food product with the antibrowning composition comprises spraying, dusting or dipping the antibrowning composition onto the food product, or merging the food product into the antibrowning composition. In some embodiments, contacting the food product with the antibrowning composition comprises dissolving the antibrowning composition in the food product.

In some embodiments, the food product is selected from the group consisting of fruits, vegetables, tubers, seafood, beverage, and a combination thereof. In some embodiments, the food product comprises an uncut vegetable or fruit, a freshly cut, ground, grated, pulped or otherwise processed vegetable or fruit. In some embodiments, the food product is uncut or freshly cut apple, lettuce, blueberry, or artichoke.

In some embodiments, the antibrowning composition is effective in reducing browning on the food product by at least about two folds for at least about 21 days as compared to the food product untreated with the antibrowning composition. In some embodiments, the antibrowning composition is effective in reducing bacterial growth on the food product by at least about 90% for at least about 21 days as compared to the food product untreated with the antibrowning composition.

Some embodiments disclosed herein provide a food product, comprising: at least one food product; and at least an antibrowning composition in an amount sufficient to inhibit enzymatic browning of the food product, wherein the antibrowning composition comprises calcium ascorbate, calcium propionate, and calcium chloride.

Some embodiments provide a method of promoting or extending freshness in a food product comprising: administering an effective amount of a composition comprising calcium ascorbate, calcium propionate, and calcium chloride to the food product, wherein the administration of said composition prohibits or reduces the growth of microbes in the food product.

In some embodiments, administering the composition to the food product comprises spraying, dusting or dipping the composition onto the food product, or merging the food product into the composition.

In some embodiments, said effective amount is a synergistically effective amount, wherein the weight ratio of calcium ascorbate, calcium propionate, and calcium chloride in the composition is about (3-25):(0.25-2):(0.2-0.3).

In some embodiments, said composition is aqueous and said effective amount is a synergistically effective amount, wherein calcium ascorbate is present in the composition in the amount of about 3% to about 25% (weight/volume), calcium propionate is present in the composition in the amount of about 0.25% to about 2% (weight/volume), and calcium chloride is present in the composition in the amount of about 0.2% to about 0.3% (weight/volume).

In some embodiments, the food product is selected from the group consisting of fruits, vegetables, tubers, seafood, beverage, and a combination thereof.

DETAILED DESCRIPTION

Figure 1:
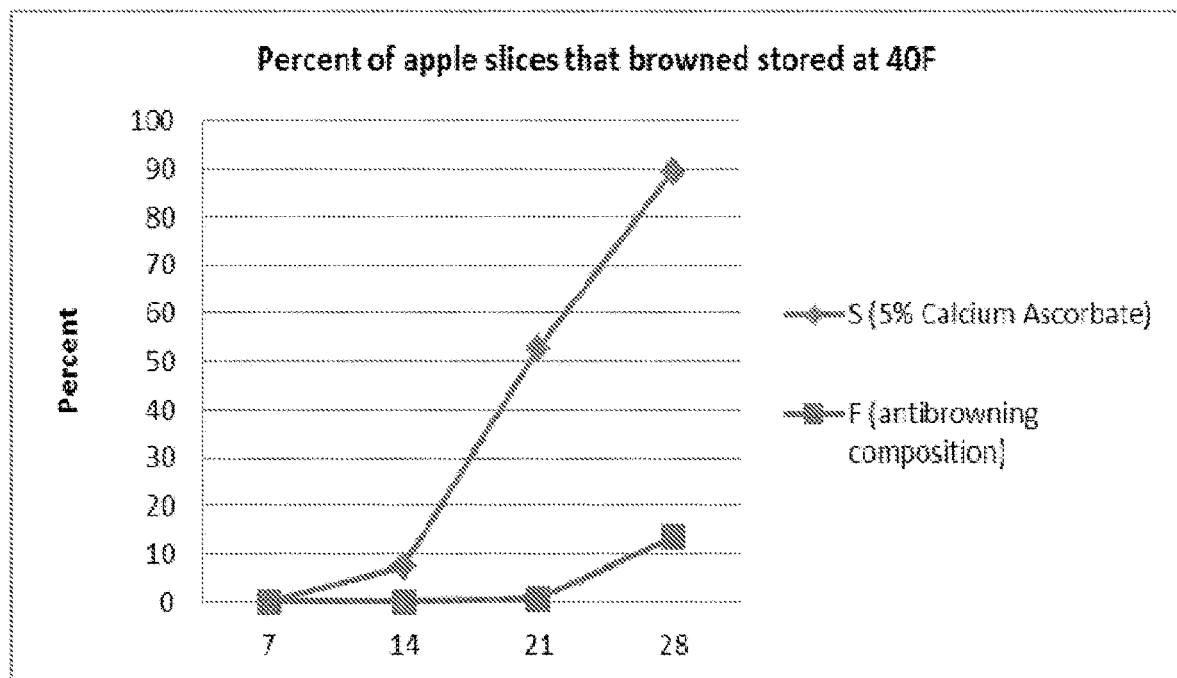
FIG. 1 is a graph showing percentages of apple slices that turn brown at 40° F. of storage at various time points.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

As used herein, "antibrowning" refers to the inhibition or reduction of browning of food products, such as fruits, vegetables, tubers, seafood, and beverage, due to enzymatic browning.

Disclosed in the present disclosure are compositions comprising an ascorbate (e.g., calcium ascorbate), a propionate (e.g., calcium propionate), and calcium chloride. The compositions can be used to inhibit enzymatic browning in food products, and/or inhibit growth of bacteria, yeasts, and molds in food products. Also disclosed herein are methods of preventing browning and/or microbial growth in food products.

Antibrowning Compositions

Antibrowning compositions are disclosed herein. The antibrowning compositions can comprise an ascorbate, a propionate and calcium chloride. Various ascorbates can be used in the compositions, for example, the ascorbate can be calcium ascorbate, sodium ascorbate or potassium ascorbate. Various propionates can also be used in the compositions, for example, the propionate can be calcium propionate or sodium ascorbate. In some embodiments, the antibrowning compositions comprise calcium ascorbate, calcium propionate and calcium chloride.

The antibrowning compositions can be in a dry form, for example as a powder. In some embodiments, the antibrowning composition can comprise calcium ascorbate in the amount of about 60%, about 65%, about 70%, about 75%, about 80%, about 85%, about 87%, about 88%, about 89%, about 90%, about 91%, about 92%, about 95%, or a range between any two of these values, by weight, based on the total weight of the composition. In some embodiments, the antibrowning composition can comprise calcium propionate in the amount of about 5%, about 7%, about 7.5%, about 8%, about 9%, about 10%, about 12%, about 14%, about 16%, about 18%, about 20%, about 22%, about 24%, or a range between any two of these values, by weight, based on the total weight of the composition. In some embodiments, the antibrowning composition can comprise calcium chloride in the amount of about 0.5%, about 1%, about 1.5%, about 2%, about 2.5%, about 3%, about 3.5%, about 4%, about 4.5%, about 5%, about 5.5%, about 6%, about 7%, or a range between any two of these values, by weight, based on the total weight of the composition. In some embodiments, the antibrowning composition comprises about 80% calcium ascorbate by weight, based on total weight of the composition. In some embodiments, the antibrowning composition comprises about 16% calcium propionate by weight, based on total weight of the composition. In some embodiments, the antibrowning composition comprises about 3% calcium chloride by weight, based on total weight of the composition. In some embodiments, the antibrowning composition comprises about 80.7% calcium ascorbate, about 16.1% calcium propionate, and about 3.2% calcium chloride by weight, based on total weight of the composition. In some embodiments, the antibrowning composition comprises about 87% to about 92% calcium ascorbate, about 7.25% to about 7.35% calcium propionate, and about 1.1% to about 5.8% calcium chloride by weight, based on total weight of the composition.

Without being bound to any particular theory, it is believed that various ingredients included in the compositions have a synergistic effect. For example, it is believed that calcium propionate and calcium chloride can act as synergists with calcium ascorbate to delay food browning, wherein the combination of active ingredients provides a greater than additive effect. In some embodiments, the composition comprises a synergistic amount of calcium ascorbate, calcium propionate and calcium chloride that is effective in preventing browning of a food product.

In the antibrowning compositions, the relative ratio by weight between ascorbate, propionate and calcium chloride can vary. For example, the relative ratio can be: Calcium Ascorbate:Calcium Propionate:Calcium Chloride=about (3-25):about (0.25-2):about (0.2-0.3). In some embodiments, the relative ratio can be: Calcium Ascorbate:Calcium Propionate:Calcium Chloride=about 5:about 1:about 0.2. In some embodiments, the relative ratio can be: Calcium Ascorbate: Calcium Propionate:Calcium Chloride=about 25:about 1:about 0.2.

The amount of the combination of calcium ascorbate, calcium propionate and calcium chloride in the antibrowning composition can vary. For example, the combination of calcium ascorbate, calcium propionate and calcium chloride can be present in the composition in the amount of about 10%, about 20%, about 30%, about 40%, about 50%, about 60%, about 70%, about 75%, about 80%, about 85%, about 90%, about 95%, about 98%, about 99%, or any range between two of these values by weight, based on the total weight of the composition.

The antibrowning compositions disclosed herein can also be in a liquid form, for example an aqueous solution or an aerosol. The weight/volume percentage (wt/vol) of calcium ascorbate, calcium propionate and calcium chloride in the liquid composition can vary. For example, the calcium ascorbate can be present in the liquid composition in the amount of about 1% wt/vol, about 2% wt/vol, about 3% wt/vol, about 3.5% wt/vol, about 4% wt/vol, about 4.5% wt/vol, about 5% wt/vol, about 5.5% wt/vol, about 6% wt/vol, about 6.5% wt/vol, about 7% wt/vol, about 7.5% wt/vol, about 8% wt/vol, about 9% wt/vol, about 10% wt/vol, about 15% wt/vol, about 20% wt/vol, about 25% wt/vol, or a range between any two of these values. The calcium propionate can be present in the liquid composition in the amount of about 2% wt/vol, about 2.5% wt/vol, about 0.3% wt/vol, about 0.5% wt/vol, about 0.6% wt/vol, about 0.7% wt/vol, about 0.8% wt/vol, about 0.9% wt/vol, about 1% wt/vol, about 1.1% wt/vol, about 1.2% wt/vol, about 1.3% wt/vol, about 1.4% wt/vol, about 1.5% wt/vol, about 1.6% wt/vol, about 1.8% wt/vol, about 2% wt/vol, about 3% wt/vol, or a range between any two of these values. The calcium chloride can be present in the liquid composition in the amount of about 0.1% wt/vol, about 0.15% wt/vol, about 0.2% wt/vol, about 0.25% wt/vol, about 0.3% wt/vol, about 0.35% wt/vol, about 0.4% wt/vol, or a range between any two of these values. In some embodiments, the concentration of calcium ascorbate in the liquid composition is about 4% wt/vol to about 8% wt/vol. In some embodiments, the concentration of calcium propionate in the liquid composition is about 0.5% wt/vol to about 2% wt/vol. In some embodiments, the concentration of calcium chloride in the liquid composition is about 0.2% wt/vol to about 0.3% wt/vol. In some embodiments, the liquid composition is an aqueous solution that contains about 5% wt/vol calcium ascorbate, about 1% wt/vol calcium propionate, and about 0.2% calcium chloride. In some embodiments, the liquid composition is an aqueous solution that contains about 25% wt/vol calcium ascorbate, about 2% wt/vol calcium propionate, and about 0.3% calcium chloride. In some embodiments, the liquid composition is an aqueous solution that contains about 3% wt/vol calcium ascorbate, about 0.25% wt/vol calcium propionate, and about 0.2% calcium chloride. In some embodiments, the liquid composition is an aqueous solution that contains about 3% to about 25% wt/vol calcium ascorbate, about 0.25% to about 2% wt/vol calcium propionate, and about 0.2% to about 0.3% calcium chloride.

The antibrowning compositions can be at various pH values. For example, the composition can be at about pH 5, about pH 5.5, about pH 6, about pH 6.5, about pH 7, about pH 7.5, about pH 8, about pH 8.5, about pH 9, or a range between any two of these values. In some embodiments, the composition is at about pH 6 to about pH 7.5. In some embodiments, the composition is at about pH 7. Without being bound to any particular theory, it is believed that a composition at neutral pH is more effective in preventing browning in food products than a composition that is acidic.

The antibrowning composition disclosed herein can also comprise one or more additional ingredients, for example enzymatic browning inhibitors. Examples of enzymatic browning inhibitors include, but are not limited to, reducing agents such as sulfites, ascorbic acid, erythorbic acid, cysteine, synthetic antioxidants (such as butylated hydroxyanisole (BHA), butylated hydroxytoluene (BHT), tertiarybutyl hydroxyquinone (TBHQ) and propyl gallate (PG)), and plant-based phenolic compounds (such as tocopherols, flavonoid compounds, cinnamic acid derivatives, and coumarins); acidulants such as citric, malic, and phosphoric acids; chelators such as sorbic acid, polycarboxylic acids (citric, malic, tartaric, oxalic, and succinic acids), polyphosphates (ATP and pyrophosphates), macromolecules (porphyrins, proteins), and EDTA; and enzyme inhibitors such as aromatic carboxylic acids, substituted resorcinols, halide salts, honey, amino acids, and proteins.

In some embodiments, the composition disclosed herein does not include any enzymatic browning inhibitor other than calcium ascorbate, calcium propionate and calcium chloride, for example, any of the enzymatic browning inhibitors listed above. In some embodiments, the composition does not include sulfite.

Effectiveness of Antibrowning Compositions

The antibrowning compositions disclosed herein are effective in preventing browning in food products. In some embodiments, the compositions can reduce browning of a food product stored for a set period of time. The set period of time can vary, for example, at least about one week, at least about two weeks, at least about three weeks, at least about four weeks, at least about five weeks, at least about six weeks, at least about seven weeks, or more. In some embodiments, the set period of time is about one week, about two weeks, about three weeks, about four weeks, about one month, about five weeks, about six weeks, about seven weeks, about eight weeks, about two months, or a range between any two of these values.

In some embodiments, browning of the food product treated with the antibrowning composition disclosed herein is reduced by at least about 30%, at least about 40%, at least about 50%, at least about 60%, at least about 70%, at least about 80%, or at least about 90% as compared to the food product stored without the treatment of the composition. In some embodiments, the compositions prevent or inhibit food browning stored for more than 21 days. In some embodiments, the compositions prevent or inhibit food browning stored for at least about 28 days.

In some embodiments, the treatment of the antibrowning composition can reduce browning on the food product by at least about two folds, at least about three folds, at least about three folds, at least about four folds, or at least about five folds, for at least about 21 days as compared to the food product untreated with the antibrowning composition. In some embodiments, the treatment of the antibrowning composition can reduce browning on the food product by at least about two folds, at least about three folds, at least about three folds, at least about four folds, or at least about five folds, for at least about 28 days as compared to the food product untreated with the antibrowning composition.

Antimicrobial Properties of Antibrowning Compositions

In some embodiments, the antibrowning compositions disclosed herein also can prevent microbial growth. For example, the compositions can, in some embodiments, prevent or inhibit growth of bacteria (for example, aerobic bacteria), yeasts and/or molds in a food product. In some embodiments, the growth of the bacteria, yeasts and/or molds can be prevented in the food product stored for at least about one week, at least about two weeks, at least about three weeks, at least about four weeks, at least about five weeks, at least about six weeks, at least about seven weeks, or more. In some embodiments, the antibrowning composition can prevent or inhibit growth of bacteria, yeasts and/or molds in a food product stored for about one week, about two weeks, about three weeks, about four weeks, about five weeks, about six weeks, about seven weeks, or a range between any two of these values. In some embodiments, the antibrowning compositions can prevent or inhibit growth of bacteria, yeasts and/or molds in a food product stored for at least about one month, at least about two months, at least about three months, or more. In some embodiments, the antibrowning composition prevents or inhibits growth of bacteria, yeasts and/or molds in a food stored for at least about three weeks.

In some embodiments, bacterial growth of the food product treated with the antibrowning composition disclosed herein is reduced by at least about 50%, at least about 60%, at least about 70%, at least about 80%, at least about 90%, at least about 95%, or at least about 99% as compared to the food product stored without the treatment of the composition for a set period of time. The length of the set period of time can vary, for example, about one week, about two weeks, about three weeks, about four weeks, about five weeks, about six weeks, about seven weeks, or more. In some embodiments, the aerobic bacterial growth of the food product treated with the antibrowning composition is reduced by about 99% or more over a month of storage as compared to the food product stored without treatment.

In some embodiments, yeast or mold growth of the food product treated with the antibrowning composition is reduced by at least about 50%, at least about 60%, at least about 70%, at least about 80%, at least about 90%, at least about 95%, or at least about 99% as compared to the food product stored without the treatment of the composition for a set period of time. The length of the set period of time can vary, for example, about one week, about two weeks, about three weeks, about four weeks, about five weeks, about six weeks, about seven weeks, or more. In some embodiments, the yeast growth of the food product treated with the antibrowning composition is reduced by about 90% or more over about two or three weeks of storage as compared to the food product stored without treatment. In some embodiments, the mold growth of the food product treated with the antibrowning composition is reduced by about 90% or more over about three weeks of storage as compared to the food product stored without treatment.

In some embodiments, the composition disclosed herein can prevent browning and microbial spoilage of a food product to allow a shelf life of about 18 days, about 19 days, about 20 days, about 21 days, about 22 days, about 23 days, about 24 days, about 25 days, about 26 days, about 27 days, about 28 days, or longer.

The antibrowning compositions disclosed herein can be used on food products stored under various conditions. For example, the food can be stored under refrigerated conditions. Refrigerated conditions include, but are not limited to 4° C., 40° F., and freezing temperatures.

Methods for Antibrowning and/or Inhibiting Microbial Growth

The compositions disclosed herein can be used to inhibit browning in food products. The compositions, in some embodiments, can also be used to inhibit growth of bacteria, yeasts and/or molds in food products. For example, the antibrowning and/or antimicrobial objectives can be achieved by contacting the food products with one or more compositions disclosed herein in an amount effective to inhibit enzymatic browning and/or microbial growth.

The types of food products that can be treated by the compositions disclosed herein for inhibiting browning and/or microbial growth is not particularly limited. For example, the food products can include fruits, vegetables, tubers, seafood, beverage, and any combinations thereof. Examples of fruit include, but are not limited to apples, apricots, avocados, bananas, peaches, plums, pears, blueberries, raspberries, strawberries, blackberries, mangoes, papayas, and any combinations thereof. Examples of vegetables include, but are not limited to artichokes, beans, lettuce, bell peppers, carrots, celery, fresh spices (such as basil, rosemary, lemongrass, oregano, parsley, etc.), corn, garlic, horseradish, leeks, lima beans, mushrooms, onions, parsnips, peas, pimiento, tomato, turnips, eggplants, and any combinations thereof. Non-limiting examples of tuber include Russet, Kennebec, Hilite, Norkota and Norgold varieties of *Solanum tuberosum*, and any combinations thereof. The food products can be unprocessed or processed. In some embodiments, the food is freshly cut, ground, grated, pulped or otherwise processed vegetable or fruit. The fruit can be uncut or cut fresh fruit, or dry fruit. For example, the food can be slices, shreds, and dices of fruits or vegetables. In some embodiments, the food is freshly-cut apple slice. The vegetables can be uncut or cut. In some embodiments, the vegetable is lettuce or artichoke.

In some embodiments, the antibrowning composition is added to the surfaces of the food product, for example vegetable or fruit surfaces, exposed by cutting, grinding, slicing, grating, pulping or other processing to inhibit the rate of browning at the surface exposed by the processing. In some embodiments, the composition is delivered to the food product from an aqueous solution. In some embodiments, the composition is added as a solid to a liquid food, such as a vegetable juice, a fruit juice, or other beverage.

In some embodiments, the composition is in liquid form, for example an aqueous solution. A solid food, to be contacted with a composition, for antibrowning and/or microbial inhibition can be dipped or otherwise submerged in the composition, or sprayed with an aerosol containing the composition. In some embodiments, the composition is in solid form. A food can be dusted with the solid composition for antibrowning and/or microbial inhibition. For a liquid food, such as juice or other beverage, the composition (solid or liquid), can be dissolved in the liquid food. In some embodiments, the composition is dissolved in the liquid food at low levels so that no significant alteration of the taste or other sensory factors occurs.

The antibrowning and/or antimicrobial treatment of food products by the compositions can be performed under various temperatures. For example, the treatment can be performed at about 0° C., about 5° C., about 10° C., about 15° C., about 20° C., about 25° C., about 30° C., about 35° C., or a range between two of any these values. In some embodiments, the treatment can be performed under normal room temperature (that is, about 25° C.).

In some embodiments, the antibrowning and/or antimicrobial treatment can further include contacting the food with one or more additional enzymatic antibrowning inhibitors.

EXAMPLES

Additional embodiments are disclosed in further detail in the following examples, which are not in any way intended to limit the scope of the claims.

Example 1

Antibrowning and Antimicrobial Treatment of Apple Slices

Apples were washed in 100 ppm chlorine wash, and then sliced and cored into six sections using a Sunkist Sectioner model 100. Apple slices were dipped into a control solution of 5% calcium ascorbate solution and an antibrowning solution containing 5% calcium ascorbate, 1% calcium propionate and 0.2% calcium chloride for 1 to 2 minutes with agitation, respectively. The apple slices were then collected from the solutions and dried using a hand salad spinner spun at high speed for a minute. After drying, 4 to 6 apple slices were packed into micro-perforated plastic bags used commercially for sliced apples and stored at 40° F. to observe the development of browning and growth of bacteria, yeasts and molds.

The stored apple slices were checked for browning and growth of bacteria, yeasts and molds at days 7, 14, 21, and 28 after being treated with the 5% calcium ascorbate solution or the antibrowning solution. Two apple slices were taken out of the bag and placed in a sterile whirl pak along with 100 ml of DI water and shaken 25 times in a 1-food arc. The resulting wash solution was diluted by adding 1 ml of the wash into 10 ml DI water and repeating this dilution to achieve the needed log reduction series, which was then plated in duplicate onto 3M Petri films to determine aerobic plate counts (APC), yeasts and molds, respectively. The number of colonies formed on the APC plates was counted after 2-3 days of storage at 35° C., and yeast and mold plates were counted after 4 or 5 days at room temperature. The apple slices used for plating were discarded.

The antibrowning results are summarized in Table 1 and FIG. 1.

TABLE 1

Antibrowning treatment of apple slices

| Formula* | Time of Storage (days) | Number of Brown Slices | Number of Total Slices | Percentage of Brown Slices (%) |
|---|---|---|---|---|
| S | 7 | 0 | 144 | 0 |
| F | 7 | 0 | 144 | 0 |
| S | 14 | 10 | 132 | 7.6 |
| F | 14 | 0 | 132 | 0 |
| S | 21 | 63 | 120 | 52.5 |
| F | 21 | 1 | 120 | 0.8 |
| S | 28 | 93 | 104 | 89.4 |
| F | 28 | 14 | 104 | 13.5 |

*S=the control 5% calcium ascorbate solution; F=Antibrowning solution containing 5% calcium ascorbate, 1% calcium propionate and 0.2% calcium chloride.

As shown in Table 1 and FIG. 1, after 28 days, less than 10% of the apple slices treated with the antibrowning solution showed browning, compared to nearly 90% browning for apple slices treated with the control 5% calcium ascorbate solution. These results demonstrate that the antibrowning solution disclosed herein is effective in preventing browning in food products.

The results for inhibition of bacterial, yeast and mold growth are summarized in Table 2 (FIG. 2), Table 3 (FIG. 3), and Table 4 (FIG. 4), respectively.

TABLE 2

Inhibition of aerobic bacterial growth

| Formula* | Time of Storage (days) | APC Count | APC Average | Formula* | Time of Storage (days) | APC Count | APC Average |
|---|---|---|---|---|---|---|---|
| S | 7 | 4551 | | F | 7 | 45 | |
| S | 7 | 59125 | | F | 7 | 113 | |
| S | 7 | 120 | 21265 | F | 7 | 3 | 54 |
| S | 14 | 4137 | | F | 14 | 33 | |
| S | 14 | 1123 | | F | 14 | 7 | |
| S | 14 | 109000 | 38087 | F | 14 | 0 | 13 |
| S | 21 | 29833 | | F | 21 | 0 | |
| S | 21 | 5313 | 17573 | F | 21 | 1000 | 500 |
| S | 28 | 157375 | | F | 28 | 0 | |
| S | 28 | 53100 | 105238 | F | 28 | 125 | 63 |

*S=the control 5% calcium ascorbate solution; F=Antibrowning solution containing 5% calcium ascorbate, 1% calcium propionate and 0.2% calcium chloride.

Figure 2:
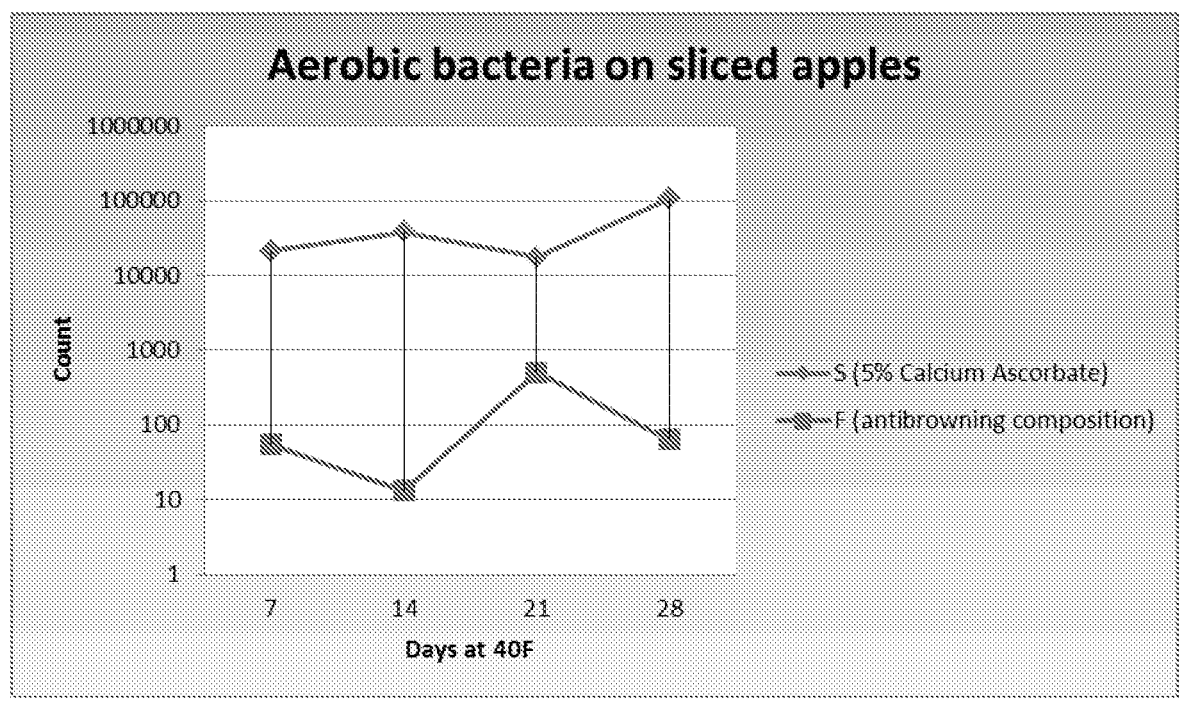
FIG. 2 is a graph showing aerobic bacteria count on apple slices stored at 40° F. of storage at various time points.

As shown in Table 2 and FIG. 2, after 28 days, apple slices treated with the antibrowning solution had less than 100 colony forming units (CFU) of bacteria per two slice samples, while the apples treated with the control 5% calcium ascorbate solution harbored 157,000 CFU of bacteria per two slice samples. Thus, the antibrowning solution is significantly more effective in preventing aerobic bacterial growth than the control 5% calcium ascorbate solution for at least 28 days.

TABLE 3

Inhibition of yeast growth

| Formula* | Time of Storage (days) | Yeast Count | Average of Yeast Count | Formula* | Time of Storage (days) | Yeast Count | Average of Yeast Count |
|---|---|---|---|---|---|---|---|
| S | 7 | 81 | | F | 7 | 43 | |
| S | 7 | 208 | | F | 7 | 1150 | |
| S | 7 | 361 | 217 | F | 7 | 30 | 408 |
| S | 14 | 89 | | F | 14 | 31 | |
| S | 14 | 55 | | F | 14 | 18 | |
| S | 14 | 37575 | 12573 | F | 14 | 2238 | 762 |
| S | 21 | 738 | | F | 21 | 285 | |
| S | 21 | 1938 | 1338 | F | 21 | 2118 | 1202 |
| S | 28 | 6400 | | F | 28 | 37117 | |
| S | 28 | 5975 | 6188 | F | 28 | 5213 | 21165 |

*S=the control 5% calcium ascorbate solution; F=Antibrowning solution containing 5% calcium ascorbate, 1% calcium propionate and 0.2% calcium chloride.

TABLE 4

Inhibition of mold growth

| Formula* | Time of Storage (days) | Mold Count | Average of Mold Count | Formula* | Time of Storage (days) | Mold Count | Average of Mold Count |
|---|---|---|---|---|---|---|---|
| S | 7 | 29 | | F | 7 | 0 | |
| S | 7 | 16 | | F | 7 | 0 | |
| S | 7 | 15 | 20 | F | 7 | 0 | 0 |
| S | 14 | 25 | | F | 14 | 0 | |
| S | 14 | 0 | | F | 14 | 0 | |
| S | 14 | 25 | 17 | F | 14 | 0 | 0 |
| S | 21 | 13 | | F | 21 | 0 | |
| S | 21 | 0 | 7 | F | 21 | 0 | 0 |
| S | 28 | 1250 | | F | 28 | 875 | |
| S | 28 | 0 | 625 | F | 28 | 350 | 613 |

*S=the control 5% calcium ascorbate solution; F=Antibrowning solution containing 5% calcium ascorbate, 1% calcium propionate and 0.2% calcium chloride.

Figure 3:
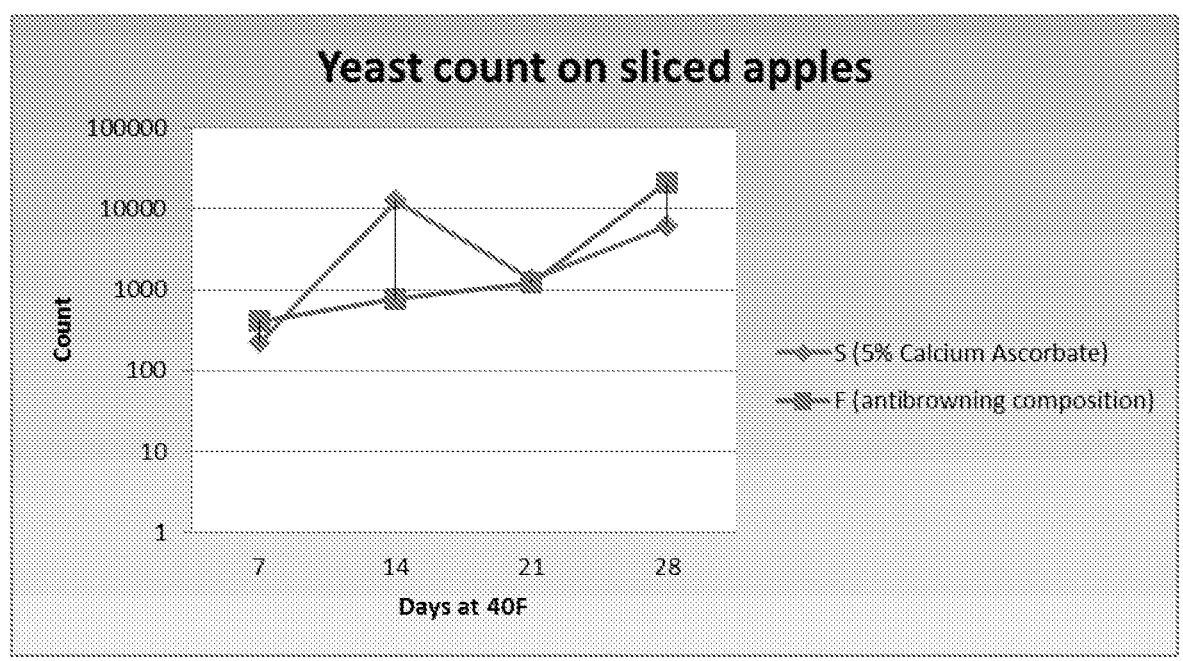
FIG. 3 is a graph showing yeast count on apple slices stored at 40° F. of storage at various time points.
Figure 4:
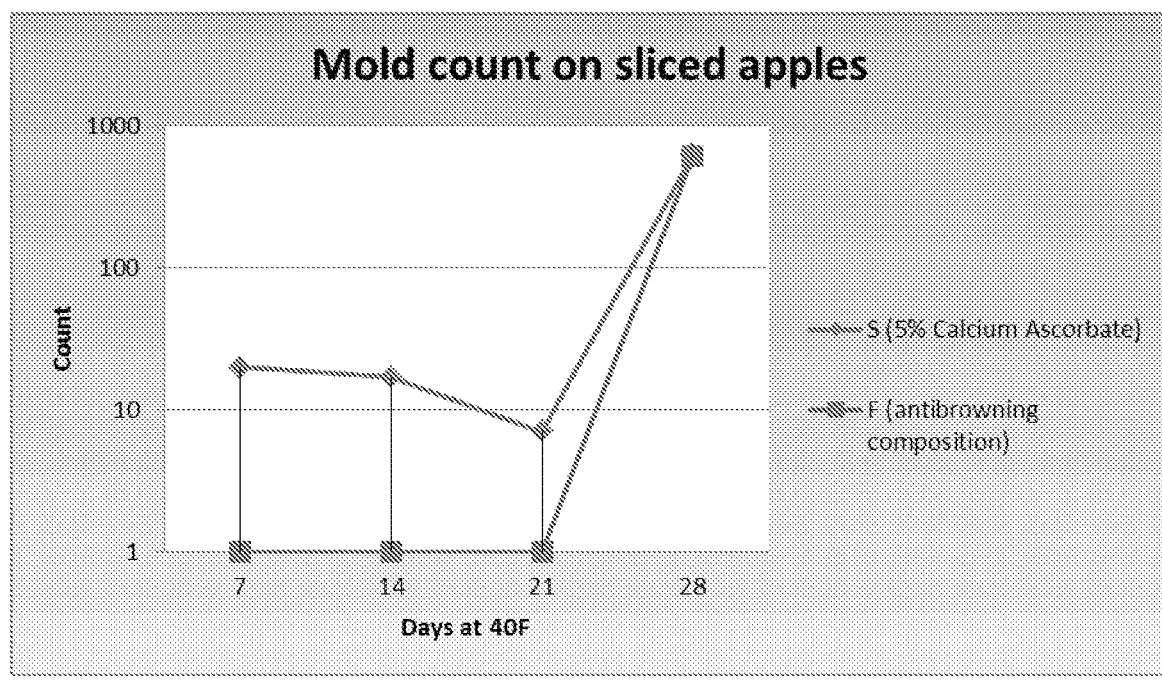
FIG. 4 is a graph showing mold count on apple slices stored at 40° F. of storage at various time points.

As shown in Table 3 and FIG. 3, yeast growth inhibition by the antibrowning composition peaked at 14 days, with an average 12,000 spores per two apple slice samples treated with the control 5% calcium ascorbate solution compared with 700 yeast spores for the two apple slice samples treated with antibrowning composition; and the suppression of yeast growth continued for up to 21 days. As shown in Table 4 and FIG. 4, mold inhibition continued through 21 days of storage with an average 1 log reduction or 10 to 20 active mold colonies per two slice samples treated with the antibrowning composition compared with an average of 1 active colony per two slice samples treated with the antibrowning composition. These results demonstrate that the antibrowning solution disclosed herein is effective in preventing growth of yeasts and molds in food products.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for inhibiting browning of food, comprising: contacting a food product with an liquid antibrowning composition in an amount sufficient to inhibit enzymatic browning, wherein the antibrowning composition comprises calcium ascorbate, calcium propionate, and calcium chloride, wherein calcium ascorbate is present in the composition in the amount to no more than 25% (weight/volume), calcium propionate is present in the composition in the amount from about 0.25% (weight/volume) to about 3% (weight/volume), and calcium chloride is present in the composition in the amount from about 0.1% (weight/volume) to about 0.4% (weight/volume).

2. The method of claim 1, wherein contacting the food product with the antibrowning composition comprises spraying or dipping the antibrowning composition onto the food product, or merging the food product into the antibrowning composition.

3. The method of claim 1, wherein the food product is selected from the group consisting of fruits, vegetables, tubers, seafood, beverage, and a combination thereof.

4. The method of claim 1, wherein the food product comprises an uncut vegetable or fruit, a freshly cut, ground, grated, pulped or otherwise processed vegetable or fruit.

5. The method of claim 1, wherein the food product is uncut or freshly cut apple, lettuce, blueberry, or artichoke.

6. The method of claim 1, wherein said composition comprises calcium chloride in the amount of 0.1-0.3% weight/volume, calcium ascorbate comprises about 3-15% in weight/volume, and calcium propionate comprises about 0.3-2% weight/volume.

7. The method of claim 1, wherein said calcium ascorbate is present in the antibrowning composition in the amount of about 5% (weight/volume), calcium propionate is present in the antibrowning composition in the amount of about 1% (weight/volume), and calcium chloride is present in the antibrowning composition in the amount of about 0.2% (weight/volume).

8. The method of claim 1, wherein calcium ascorbate is present in the amount of up to 5% weight/volume and calcium propionate of up to 1% weight/volume.

9. The method of claim 1, wherein the antibrowning composition is effective in reducing browning on the food product for about 21 days or longer.

10. The method of claim 1, wherein the antibrowning composition is effective in reducing bacterial growth on the food product by at least about 90% for at least about 21 days as compared to the food product untreated with the antibrowning composition.

11. The method of claim 1, comprising reducing said browning in the presence of oxygen.

12. The method of claim 1, wherein said composition further reduces bacteria for up to four weeks after contact with said composition compared to food not contacted with said composition.

13. The method of claim 1, wherein said composition further reduces yeast and mold or up to three weeks after contact with said composition compared to food not contacted with said composition.

14. The method of claim 1, wherein said composition reduces browning in the presence of oxygen for up to at least 21 days and reduces yeast and mold for up to three weeks after contact with said composition compared to food not contacted with said composition.

15. A method of promoting or extending freshness in a food product, comprising: administering an effective amount of a liquid antibrowning composition comprising calcium ascorbate, calcium propionate, and calcium chloride to the food product, wherein calcium ascorbate is present in the antibrowning composition in the amount from about 3% (weight/volume) to about 25% (weight/volume), calcium propionate the antibrowning composition in the amount from about 0.25% (weight/volume) to about 2% (weight/volume), and calcium chloride is present in the antibrowning composition in the amount from about 0.1% (weight/volume) to about 0.4% (weight/volume), and wherein the administration of said antibrowning composition prohibits or reduces the growth of microbes in the food product.

16. The method of claim 15, wherein administering the antibrowning composition to the food product comprises spraying, dusting or dipping the antibrowning composition onto the food product, or merging the food product into the antibrowning composition.

17. The method of claim 15, wherein said composition comprises calcium chloride in the amount of 0.1-0.3% weight/volume, calcium ascorbate comprises about 3-15% in weight/volume, and calcium propionate comprises about 0.3-2% weight/volume.

18. The method of claim 15, wherein said composition comprises calcium ascorbate is present in the antibrowning composition in the amount of about 5% (weight/volume), calcium propionate is present in the antibrowning composition in the amount of about 1% (weight/volume), and calcium chloride is present in the antibrowning composition in the amount of about 0.2% (weight/volume).

19. The method of claim 1, wherein said composition reduces browning for up to at least 21 days.

20. The method of claim 1, further comprising reducing said browning in the presence of oxygen.

21. The method of claim 1, wherein said composition reduces browning in the presence of oxygen for up to at least 21 days and reduces yeast and mold for up to three weeks after contact with said composition compared to food not contacted with said composition.

* * * * *